Nov. 17, 1953 E. C. SUMMERS Re. 23,741

PROCESS OF PRODUCING FLOCKED DESIGNS

Original Filed April 9, 1949

DECORATIVE PATTERN

Inventor
EDWARD CLAYTON SUMMERS

By Beale and Jones
Attorney

Reissued Nov. 17, 1953

Re. 23,741

UNITED STATES PATENT OFFICE 23,741

PROCESS OF PRODUCING FLOCKED DESIGNS

Edward Clayton Summers, Janesville, Wis.

Original No. 2,636,337, dated April 28, 1953, Serial No. 86,584, April 9, 1949. Application for reissue September 3, 1953, Serial No. 378,442

6 Claims. (Cl. 154—123)

Matter enclosed in heavy brackets [ ] appears in the original patent but forms no part of this reissue specification; matter printed in italics indicates the additions made by reissue.

This invention relates to the art of producing finishes by applying adhesive material on a surface and then embedding flock or other particulate material in the adhesive.

Up to the present time it has not been possible to produce flock finish designs in which the borders between different areas in the designs were sharply defined. No process in use by the prior art has allowed the manufacturer to exert the close control over the distribution of the flock necessary for sharply-defined designs.

It is therefore the object of this invention to provide a process for producing distinctly-defined designs in flock-finished surfaces. A further object of the invention is to provide such a process in which more than one color of flock or more than one type of flock fiber or other type of particle may be used in creating the design.

Figure 9:
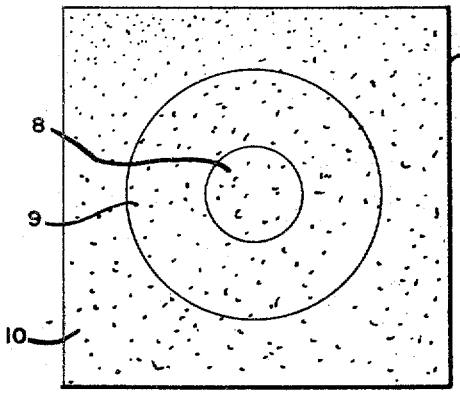

The foregoing objects may be achieved by the invention hereafter described and illustrated in the accompanying drawings wherein Figures 1 to 8 inclusive are essentially diagrammatic, side elevational views showing the sequential stages of forming of one form of composite design and Figure 9 is a diagrammatic top plan view of the design formed by the stages of Figures 1 to 8 inclusive.

Figure 3:
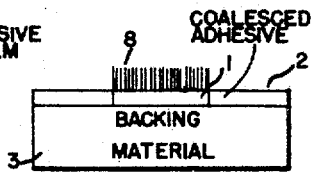
Figure 4:
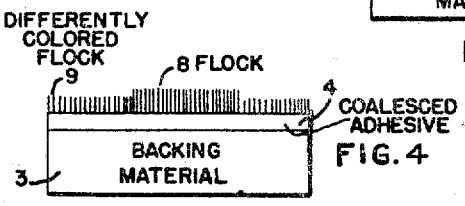
Figure 5:
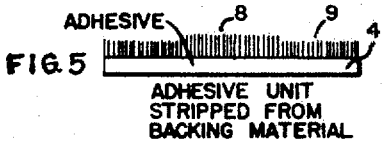
Figure 6:
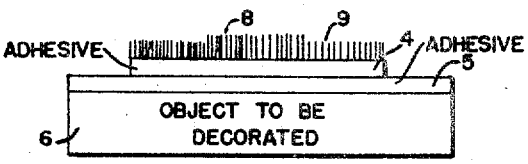
Figure 7:
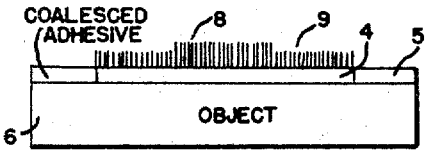
Figure 8:
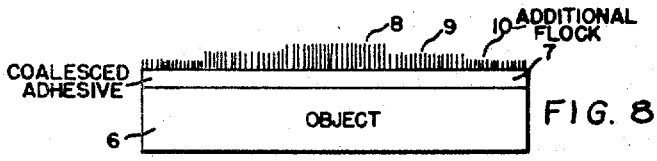

Referring to Figures 1 to 4 inclusive, 1 represents a backing sheet or film of adhesive, the top surface of which is coated with flock or particulate matter or fibers of a given color 8. The element or pattern shown in Figure 1 may be preformed on a blank of desired shape or may be cut out of a larger blank of different size. 3 represents either an object to be decorated or a sheet or block of backing material the upper surface of which is coated with a layer or film of adhesive 2. Adhesive 2 is preferably wet with a solvent which has a softening effect on the adhesive film 1 so that the film or base sheet 1, when properly placed on the upper surface of 3, may be embedded in and bonded to adhesive 2, as shown in Figure 3, leaving the area surrounding sheet 1 covered with a coating of tacky adhesive of desired thickness. This area of tacky adhesive is then coated with flock or particulate matter or fibers of a different color 9 as shown in Figure 4.

Where a design requiring one or more additional colors is desired, the adhesive film or sheet 4 may be stripped from the back 3 to produce a unit such as shown in Figure 5. This unit may be placed as desired on an object 6 the upper surface of which is coated with an adhesive layer or film 5 in a manner similar to that described in Figures 2 and 3 above. Flock or particulate matter or fibers 10 of any color may be applied to the otherwise uncovered area of the tacky surface 5. Upon drying, a pattern such as shown in Figure 9 may be obtained, wherein for example, 8 may be an area or pattern of red, 9 a pattern of white, and 10 a pattern of blue. It should be understood that any desired colors and any desired pattern may be used in lieu of the form illustrated in Figure 9. It should also be understood that the flock lines 8, 9 and 10 of Figures 1 to 8 inclusive are shown as possessing different lengths merely to illustrate differences in color or composition and not necessarily differences in fiber length.

However, it should be understood that the flock lines 8, 9 and 10 of Figures 1 to 8 inclusive may represent differences in fiber length or other characteristics and properties and not necessarily differences in color. The process of this invention may be carried out to produce designs wherein all portions of the design are of a single color but wherein distinctive patterns may be provided by the use of flock of different properties other than color.

Figure 1:
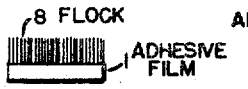
Figure 2:
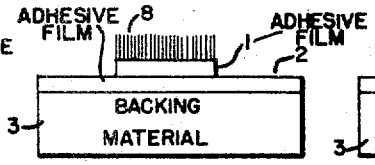

The backing sheet 1 may be formed in several ways. One easy way to produce the structure shown in Figure 1, wherein the backing sheet 1 is a film of adhesive, is by the use of a base to which the dry adhesive will not adhere, such as a silicone rubber base. The moist adhesive is spread over this base. Flock is then applied to the adhesive. After the adhesive dries, the adhered flock may be stripped from the silicone rubber base readily, to form the structure of Figure 1. This is the preferred method of the invention, but other methods of forming this structure are suitable. For instance, the backing sheet 1 may be merely the woven base of a piece of material having the desired flock finish. This material may be cut into the desired decorative shapes. Another possible method of providing the structure shown in Fig. 1 is to build up the flock finish on a very thin base material 1, so that the base material may be cut into the desired shapes.

To more clearly explain the invention, several specific examples of the use of the invention will be described.

EXAMPLE I

Small decorative flocked designs

On a base sheet of silicone rubber there is stencilled an adhesive solution of polychloroprene and conventional tackifiers to a depth of about ½ of an inch. Red colored flock is embedded in this adhesive by means of a beater bar. When the adhesive has dried, loose excess flock is easily removed, and the adhered flock is then stripped from the rubber base. Since the adhesive was originally stencilled onto the base sheet in the shape desired, there is obtained a flocked finish segment in the decorative shape desired.

EXAMPLE II

Larger, composite designs

To form a larger, composite decorative piece of flocked finish, a larger piece of silicone rubber base is used. This base may be stencilled with adhesive over the shape of the desired design, or it may be precut to the shape of the desired design. For simplicity in applying the adhesive, it is preferred to use a piece of rubber cut in the desired shape, so that the entire piece may be coated with the adhesive. On such a coated sheet, one or several of the smaller pieces from Example I may be placed. The moist adhesive will soften the backing film ! on these smaller pieces sufficiently to allow the adhesive films to coalesce, so that on drying, the flocked designs from Example I will be adhered to the larger adhesive film backing. While the adhesive is still moist, blue or other than red colored flock may be embedded in the adhesive. The piece is then dried and the entire design may then be stripped from the base. There is thus obtained a multicolored, flock finished design piece, in which the borderlines between adjacent color areas are sharply defined.

These examples illustrate the fundamentals of the invention. However, several variants will suggest themselves to those skilled in the art. For instance, it is possible to form a very strong flocked design piece by incorporating a textile material in the adhesive. The textile material will reinforce and greatly strengthen the piece, providing flex strength which is not available in the adhesive sheet itself. It is also possible to use the silk screen process to lay out the adhesive areas on the base rubber sheet, instead of using a stencil, or a precut rubber sheet. A further variation in the basic process resides in the method of creating flock finished pieces by adhering flock to a base member, then cutting this base member to the desired shape. The decorative shape thus obtained may be combined with other flock, as heretofore disclosed, or may be used by itself.

Any suitable non-adherent base may be used rather than the silicone rubber of the examples, and most known types of adhesives are suitable for use in the invention.

The decorative flocked surfaces disclosed in the above description have a plurality of obvious uses in decorating purses, toys, clothing, etc. Having thus described by invention, what I claim is:

1. A method of forming coated objects characterized by designs formed from a plurality of patterns and a plurality of portions and wherein the boundaries between the adjacent portions of said patterns are sharply defined, which comprises applying particulate matter to one face of a solvent-moistened, adhesive-coated backing, drying the adhesive coating and thereby affixing the particulate matter to said backing, applying a similar solvent-moistened adhesive coating to one face of a second backing, positioning said dried first backing over part of said coating on said second backing, whereby the solvent from said coating moistens the said first backing without moistening the particulate matter thereon, applying particulate matter of different properties on the adhesive-coated surface of said second backing and drying the adhesive coating, thereby affixing said particulate matter of different properties to said second backing without modifying the properties of the particulate matter of said first backing.

2. The method of claim 1 wherein said dried first backing is embedded in the adhesive coating on said second backing.

3. The method of claim 1 wherein said first backing, after coating and drying is cut out of a coated, dried blank of larger area.

4. The method of claim 1 wherein said second backing after coating with adhesive, positioning said first backing and drying, is cut out of a blank of larger area and then adhesively attached to a selected portion of a surface of another object.

5. The method of claim 1 wherein said adhesive coating when applied to a sheet of backing material is of such thickness that when dried the adhesive coating with attached particulate material is a self-supporting film which may readily be stripped from said backing and wherein said adhesive coating is stripped from said backing prior to affixation to a different adhesive coated surface.

6. A method of forming coated objects characterized by designs formed from a plurality of patterns and a plurality of [portions] *colors* and wherein the boundaries between the adjacent [portions] *colors* of said patterns are sharply defined, which comprises applying *colored* particulate matter to one face of a solvent-moistened, adhesive-coated backing, drying the adhesive coating and thereby affixing the particulate matter to said backing, applying a similar solvent-moistened adhesive coating to one face of a second backing, positioning said dried first backing over part of said coating on said second backing, whereby the solvent from said coating moistens the said first backing without moistening the particulate matter thereon, applying particulate matter of *a* different [properties] *color* on the adhesive-coated surface of said second backing and drying the adhesive coating, thereby affixing said particulate matter of different [properties] *color* to said second backing without modifying the [properties] *color* of the particulate matter on said first backing.

EDWARD CLAYTON SUMMERS.

References Cited in the file of this patent or the original patent

UNITED STATES PATENTS

| Number | Name | Date |
|---|---|---|
| 2,128,811 | Foster | Aug. 30, 1938 |
| 2,191,986 | Egger | Feb. 27, 1940 |
| 2,222,539 | Meston | Nov. 19, 1940 |
| 2,242,182 | McCann | May 13, 1941 |
| 2 383,598 | Glidden | Aug. 28, 1945 |
| 2,430,534 | Rodli | Nov. 11, 1947 |
| 2,502,926 | Chadwick | Apr. 4, 1950 |
| 2,534,113 | Egger | Dec. 12, 1950 |